Oct. 15, 1929.  C. G. JOHNSON  1,732,051
HIGH LIGHT STOP FOR CAMERAS
Filed Oct. 28, 1927
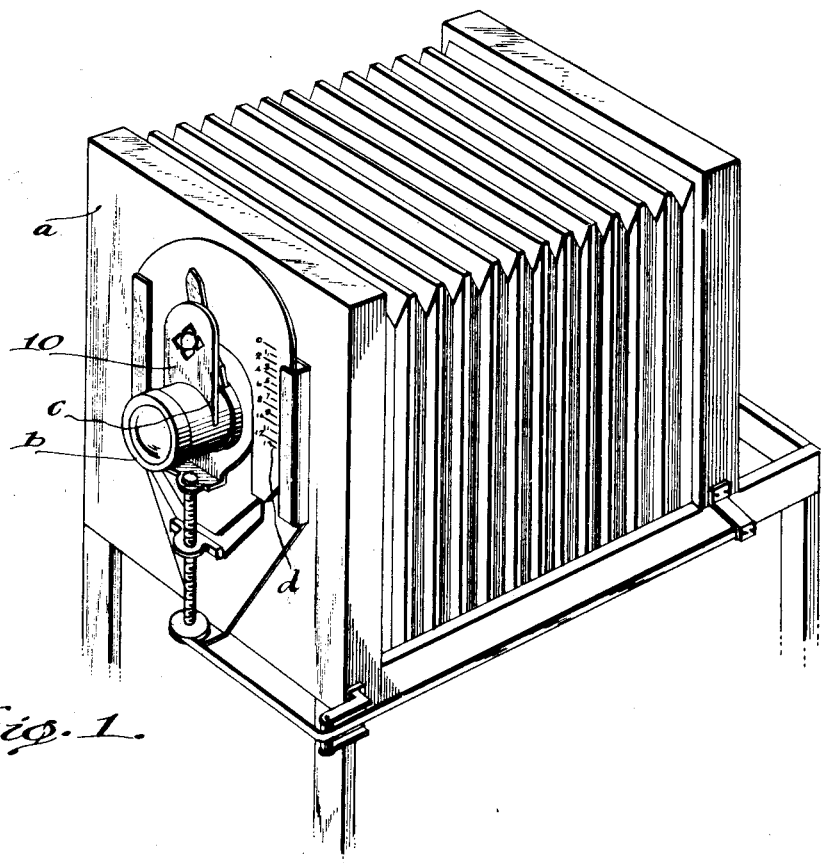
Fig. 1.
Fig. 2.
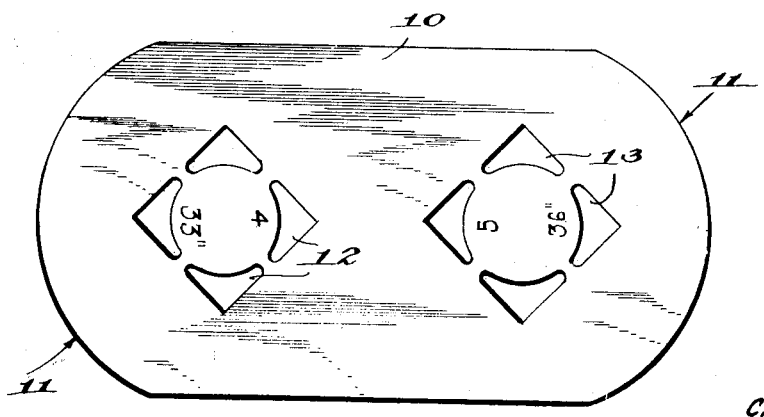
INVENTOR
CARL G. JOHNSON
BY
*Munn & Co.*
ATTORNEY Patented Oct. 15, 1929

1,732,051

UNITED STATES PATENT OFFICE

CARL G. JOHNSON, OF EAU CLAIRE, WISCONSIN

HIGH-LIGHT STOP FOR CAMERAS

Application filed October 28, 1927. Serial No. 229,371.

This invention relates to improvements in high light stops for cameras, and has for its principal object to provide for one of an extremely simplified and inexpensive construction and arrangement, whereby to produce high-light negatives on which the high-lights or extreme whites will be properly blocked.

Another object of the invention is to provide for a stop as hereinbefore characterized, and one which, although being adapted for application to and use with lenses generally, is particularly adapted for application to and use with the lens of a camera employing a stop indicator of the type as set forth in my Letters Patent of the United States, Numbered 1,520,185, and dated December 23, 1924, in which case, the stops will be numbered correspondingly for the flash stop indications of the indicator mechanism, and also marked with figures in inches, so that the distance between the lens and the ground glass or plate of the camera that comes nearest to the distance in inches, as indicated on a stop will determine the particular stop to be employed on cameras which are or are not equipped with the direct stop indicator.

With the foregoing and other equally important objects and advantages in view, the invention resides in the certain new and useful combination, construction and arrangement as will be hereinafter more fully described, set forth in the appended claims, and illustrated in the accompanying drawing, in which:

Figure 1 is a perspective view of a conventional form of camera showing a practical application of the invention thereto, and Figure 2 is a side elevation of the lens stop per se.

Referring to the drawing, the improved lens stop, as illustrated therein, comprises an elongated member having the form of a plate 10, preferably of a sheet material, such as sheet metal, which has its opposite ends rounded off, as at 11, to substantially semicircular configuration to snugly engage the lower half of the inner circumference of the lens barrel b of the camera a, when one end or the other of the same is inserted inwardly of the slot c, opening through the upper half of the circumference of the lens barrel b, substantially as shown in Figure 1.

As shown, the plate 10 is provided with sets of openings 12 and 13, preferably two in number, and each set preferably consists of four openings which are each of substantially triangular form. As shown, the set of openings 12 are smaller than the set of openings 13, and the several openings of each set are preferably arranged in square formation with the apex of the angle formed by each of their shorter sides forming the corners of the square. The inner sides, or edges, of the several openings of each square are preferably curved to the form of arcs defining a circle, having as its center the center of the square defined by the outer angled edges of the openings. Also, two of the opposite corners of each of the squares defined by this arrangement of each set of the openings 12 and 13 are disposed in alignment one with respect to the other on the longitudinal center of the member or plate 10, substantially as shown, and the two squares are spaced apart and inwardly of the oppositely curved ends of the latter in a manner that their centers approximate the centers of circles defined by the arcs of curvature of the said ends of the member or plate.

In the use of the improved stop, the usual exposure of a negative is made through the half-tone screen (not shown) and, when the desired exposure is completed, the lens of the camera a is covered and the diaphragm opened to the limit, after which the proper stop 10 will be inserted downwardly of the slot c, of the lens barrel b, when a few seconds exposure will be made, which exposure will, in any case, be just enough to properly block the high lights for the results wanted. When positioned in the lens barrel a, of a camera, the circular centers of the stop light portions of the stop plate or card, will cover and otherwise protect the exposure first made, when a slight subsequent exposure of the negative will result in blocking the whites beyond the area of the original or first exposure. By making the plate or card of an opaque material, as before mentioned, full protection to the central area of the original or first exposure is effected. A number of stop plates or cards 10 will be employed for each camera, and the sets or groups of openings 12 and 13 of the several of such plates or cards will be graduated in size and spacing in a sequence corresponding to various predetermined extension settings of the camera and lens barrel, as for instance, the lowest numbered stop will be indicated by an inch measure designation, for use when the extension settings of the camera and the lens barrel is shortest, and the highest numbered stop will be similarly indicated for the greatest extension settings of the camera and the lens barrel. Each of the sets or groups of openings 12 and 13 will be numbered in sequence of the increase of the size and spacing of the several openings of the same, substantially as shown in Figure 2. When the stops 10 are so numbered, the camera extension setting figures in inches will preferably be stamped adjacent the numbers so that the distance between the lens and the ground glass or plate (not shown) of the camera, at a particular setting, which nearest approaches an indicated distance on a stop plate will determine the particular stop to be used at such setting particularly on cameras not equipped with the direct stop indicator. It is to be noted of the spacings as aforesaid, which have to do with both the relative sizes of the several sets or groups of openings, as well as the distance the several openings of each set are spaced apart, will be proportioned preferably for each three inches of lens extension.

When employed in connection with a camera equipped with a stop indicator of the type as disclosed in my patent herein before referred to, and as is generally illustrated in Figure 1, each stop opening set or group 12 and 13 of a plate or card 10 will be numbered accordingly with the graduations to the stop indicia of the plate scale $d$ on the face of the lens board $e$ of the camera which graduations are to be proportioned to various extension settings of the camera and lens barrel, and preferably with each graduation being equivalent to a 3 inch camera and lens barrel extension.

Without further description, it is thought that the features and advantages of the invention will be readily apparent to those skilled in the art, and it will of course be understood that changes in the form, proportion and minor details of construction may be resorted to, without departing from the spirit of the invention or its scope as claimed.

Having thus fully described the invention, what is claimed is:

1. A lens stop for cameras comprising an elongated plate having an end curved to an arc of the curvature of the inner circumference of the lens barrel of a camera into which barrel the plate is to be inserted, said plate having a set of substantially triangularly shaped openings arranged in polygonal formation with opposite corners of the figure disposed in the longitudinal median line of the plate, the center of the figure being co-incident with the center of the circle defined by the arc of curvature of the plate end.

2. A lens stop for cameras comprising a plate having an end curved to an arc of the curvature of the inner circumference of the lens barrel of a camera into which barrel the plate is to be inserted, said plate having a set of substantially triangularly shaped openings grouped in polygonal formation, the inner side edges of each of the openings being curved on arcs defining a circle having as its center the center of the figure, the center of the figure being co-incident with the center of the circle defined by the arc of curvature of the plate ends, and opposite corners of the figure defined by the grouped arrangement of the openings being disposed in the longitudinal median line of the plate.

3. A light stop plate having grouped light openings assembled in polygonal formation with opposite corners of a diagonal of the figure disposed in the longitudinal median line of the plate.

CARL G. JOHNSON.